(12) United States Patent  (10) Patent No.: US 8,326,268 B2
Ahn et al.  (45) Date of Patent: Dec. 4, 2012

(54) METHOD AND SYSTEM FOR PROTECTION AGAINST THE UNAUTHORIZED USE OF A TERMINAL

(75) Inventors: Jung Hoon Ahn, Suwon-si (KR); Young Gun Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 12/475,875

(22) Filed: Jun. 1, 2009

(65) Prior Publication Data

US 2009/0305668 A1  Dec. 10, 2009

(30) Foreign Application Priority Data

Jun. 10, 2008 (KR) .................. 10-2008-0054291
Feb. 2, 2009  (KR) .................. 10-2009-0008131

(51) Int. Cl.
*H04M 3/16* (2006.01)
(52) U.S. Cl. ....................... 455/411; 455/410
(58) Field of Classification Search .......... 455/410, 455/411, 433, 435.1, 456.1, 456.2
See application file for complete search history.

(56) References Cited

U.S. PATENT DOCUMENTS

2004/0005912 A1* 1/2004 Hubbe et al. ................ 455/558
2006/0172732 A1* 8/2006 Nylander et al. ............ 455/433
2006/0189298 A1* 8/2006 Marcelli ..................... 455/411

FOREIGN PATENT DOCUMENTS

EP  1 523 202   4/2005
WO  96/35304   11/1996

OTHER PUBLICATIONS

European Search Report for corresponding EP Application No. 09161721.7-1244/2134061 dated Jun. 28, 2012.

* cited by examiner

*Primary Examiner* — Sam Bhattacharya
(74) *Attorney, Agent, or Firm* — H.C. Park & Associates, PLC

(57) ABSTRACT

A method and system for protecting against unauthorized use of a mobile terminal operating with a subscriber identity module (SIM) card is provided. The method for protecting against unauthorized use of a terminal operating with a subscriber identity module (SIM) card compares a secondary version of a temporary identity information stored in a storage unit and a primary version of the temporary identity information stored in the SIM card; sends a message containing a unique identity information to a network when the primary version and the secondary version of the temporary identity information differ from each other; and restricts operation of a function of the terminal when a registration reject message is received in response to the message containing the unique identity information.

34 Claims, 9 Drawing Sheets

METHOD AND SYSTEM FOR PROTECTION AGAINST THE UNAUTHORIZED USE OF A TERMINAL

CROSS-REFERENCE TO RELATED APPLICATIONS

This application claims priority from and the benefit of Korean Patent Application No. 10-2008-0054291, filed on Jun. 10, 2008 and Korean Patent Application No. 10-2009-0008131, filed on Feb. 2, 2009, which are hereby incorporated by reference for all purposes as if fully set forth herein.

BACKGROUND OF THE INVENTION

1. Field of the Invention

Aspects of the present invention relate to protection against an unauthorized terminal use and, in particular, a method and system for protecting against the unauthorized use of a mobile terminal operating with a subscriber identity module (SIM) card.

2. Discussion of the Background

Typically, asynchronous communication systems including Global System for Mobile Communication (GSM) as a second generation (2G) system, Universal Mobile Telecommunications System (UMTS) as a third generation (3G) system, and General Packet Radio Services (GPRS) as an intermediate generation between the 2G GSM and the 3G UMTS technologies use a subscriber identity module (SIM) or Universal SIM (USIM) in the form of a chip.

The SIM or USIM chip is provided in the form of a card (hereinafter called a SIM card) that stores information for identifying a subscriber such that, when a mobile terminal equipped with the SIM card attempts to access a service provided by a communication system network, the network identifies the subscriber with the information provided by the SIM card.

The subscriber identity information stored in the SIM card includes a unique International Mobile Subscriber Identity (IMSI), and a Temporary Mobile Subscriber Identity (TMSI) and a Packet-Temporary Mobile Subscriber Identity (P-TMSI) allocated by the network.

Unlike the unique IMSI, the TMSI and P-TMSI are allocated by the network and used for subsequently requesting registration with the network once the subscriber is identified to the network by the IMSI instead of by continued use of the IMSI. That is, the IMSI is used in the initial network registration, and the TMSI and P-TMSI are used for receiving Circuit Switched and Packet Switched service respectively after completing the initial network registration.

The TMSI or P-TMSI is allocated to the subscriber from the network which authenticated the subscriber. Accordingly, once the TMSI or P-TMSI is allocated and stored in the SIM card through a normal registration process, the mobile terminal equipped with the SIM card can access the service provided by the network using the TMSI or P-TMSI. That is, the IMSI is used in the authentication process of the initial registration, and the TMSI or P-TMSI is used for accessing the service without additional subscriber identification verification after the initial registration.

However, the SIM card that stores the TMSI or P-TMSI allocated through the normal registration process may be modified, e.g., hacked or tampered, for unauthorized (e.g., illegal) use.

In the case of a specific carrier-dedicated mobile terminal that allows access only to the carrier's network, the mobile terminal checks the network code of the IMSI and, when the network code of the IMSI stored in the SIM card is not identical to the carrier's network code, restricts the access to the network. The network code can be a carrier code such as a Mobile Network Code (MNC) constituting a portion of the IMSI. Also, the Public Land Mobile Network (PLMN) code can be used. That is, the mobile terminal identifies the PLMN code constituting a portion of the IMSI stored in the SIM card and the PLMN code received from the network and, when the PLMN codes are identical to each other, continues its normal power-on procedure. Otherwise, the mobile terminal restricts access to the network.

Normally, the specific carrier-dedicated mobile terminal only allows unrestricted access to the network when the network code of the IMSI stored in the SIM card is identical to the carrier's network code. However, when the network identity code of the IMSI stored in the SIM card has been tampered with (unauthorized modification), the mobile terminal attached to the SIM card storing the tampered IMSI can be used without authorization (e.g., illegally) on the dedicated carrier's network, normally without restriction.

SUMMARY OF THE INVENTION

Accordingly, aspects of the present invention provide a method and system to protect against unauthorized use of a mobile terminal attached to a tampered SIM card.

An aspect of the present invention includes a method and system to protect against an unauthorized use of a mobile terminal having a fraudulently unlocked SIM lock/network lock.

An aspect of the present invention includes a method and system to protect against the unauthorized use of a mobile terminal by incapacitating the fraudulent unlocking of the network lock/SIM lock.

Additional features of the invention will be set forth in the description which follows, and in part will be apparent from the description, or may be learned by practice of the invention.

The present invention discloses a method for protecting against unauthorized use of a terminal having a subscriber identity module (SIM) card that includes comparing a secondary version of a temporary identity information stored in a storage unit and a primary version of the temporary identity information stored in the SIM card; sending, when the primary and secondary versions of the temporary identity information differ from each other, a message containing a unique identity information to a network; and restricting, when a registration reject message is received in response to the message containing the unique identity information, operation of a predetermined function of the terminal.

The present invention also discloses a terminal having a subscriber identity module (SIM) card and that includes: a radio frequency unit which establishes a connection with a network providing the terminal with a service; a storage unit which stores a secondary version of a temporary identity information allocated by the network; and a control unit which compares the secondary version with a primary version of the temporary identity information stored in the SIM card, sends a message containing a unique identity information to the network when the primary and secondary versions of the temporary identity information differ from each other, and restricts operation of a function of the terminal when a registration reject message is received from the network in response to the message containing the unique identity information.

The present invention also discloses a system to protect against unauthorized use of a terminal operating with a Subscriber Identity Module (SIM) card. The system includes a terminal which compares a primary version of a temporary identity information stored in a storage unit and a secondary version of the temporary identity information, sends a message containing a unique identity information to the network when the primary and secondary versions of the temporary identity information differ from each other, and restricts operation of a function of the terminal when a registration reject message is received from the network in response to the message containing the unique identity information; and a network which checks the unique identity information contained in the message received from the terminal and sends, when the unique identity information is invalid, the registration reject message to the terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
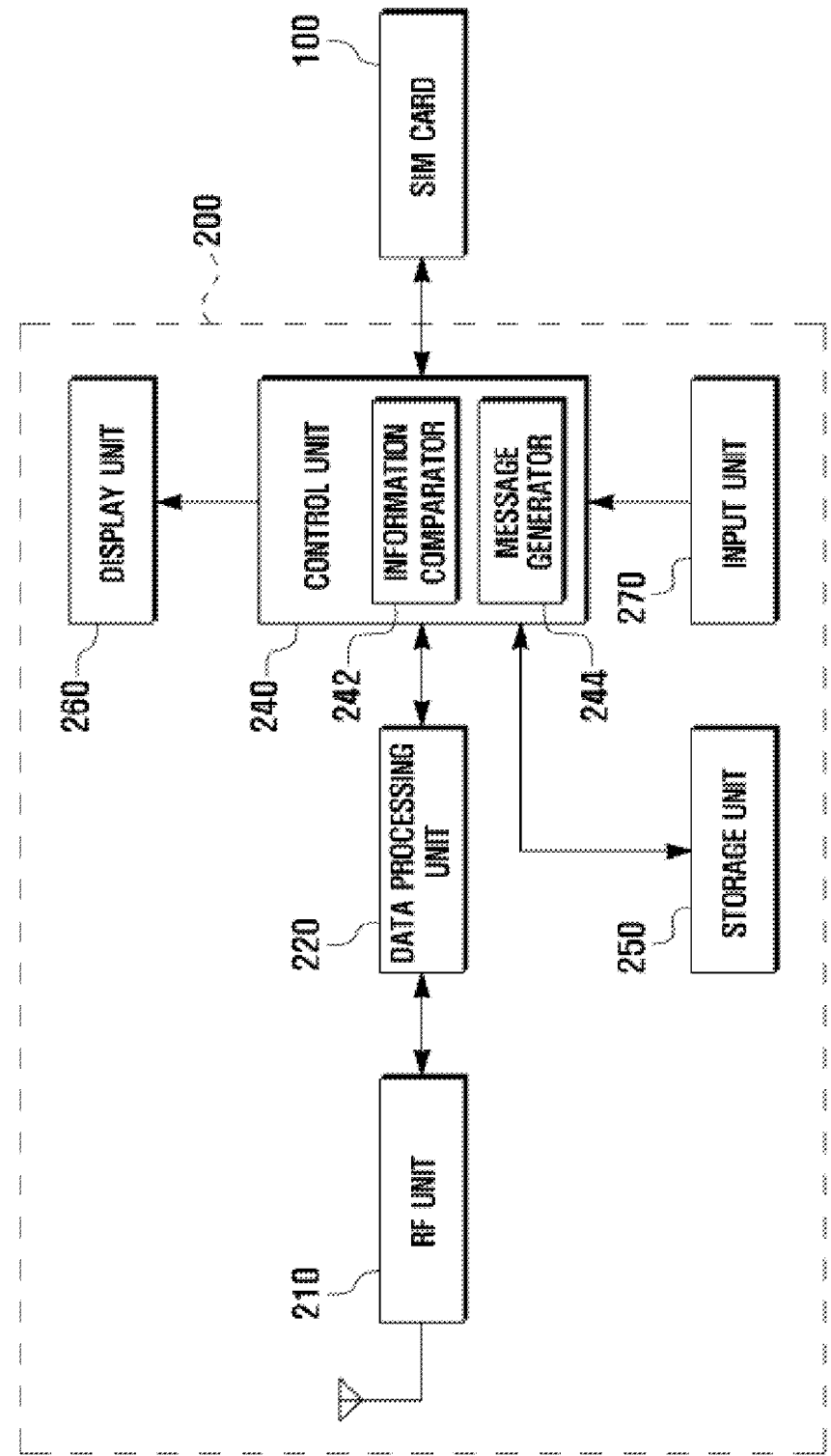
FIG. 1 is a diagram illustrating a configuration of a terminal attached to a SIM card according to an exemplary embodiment of the present invention.

Exemplary embodiments of the present invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements. Detailed descriptions of well-known functions and structures incorporated herein may be omitted to avoid obscuring the subject matter of the present invention.

FIG. 1 is a diagram illustrating a configuration of a terminal attached to a SIM card according to an exemplary embodiment of the present invention.

Although depicted with exemplary internal elements associated with the operations for protecting against an unauthorized use of the mobile terminal 200 in FIG. 1, the mobile terminal 200 may include other elements (not shown) required for supplementary functions.

In FIG. 1, the SIM card 100 contains a chip to store information to identify a subscriber on the services provided by a second generation (2G) communication network such as Global System for Mobile Communication (GSM), the information to be used for terminal authentication, billing, security, etc.

In an exemplary embodiment, the SIM card can be a Universal Integrated Circuit Card (UICC) or a Universal Subscriber Identity Module (USIM) card that are equivalents of a SIM card in a third generation (3G) communication system. Accordingly, it should be understood that the SIM card 100 is a device having at least one of SIM, USIM and their equivalents.

Referring to FIG. 1, the terminal 200 is implemented with the SIM card 100 that can be attached to and detached from the mobile terminal 200. The mobile terminal 200 includes a Radio Frequency (RF) unit 210, a data processing unit 220, a control unit 240, a storage unit 250, a display unit 260, and an input unit 270.

The SIM card 100 includes a microprocessor and a memory chip integrated in the form of an attachable/detachable card. The memory chip preferably stores subscriber information including subscriber's phone number, password, and billing account, and a unique International Mobile Subscriber Identity (IMSI) for identifying the subscriber. The memory chip also can store network registration information such as a Temporary Mobile Subscriber Identity (TMSI) or a Packet Temporary Mobile Subscriber Identity (P-TMSI) for accessing services provided by the current network. An exemplary embodiment of the IMSI is structured as shown in FIG. 2.

Figure 2:
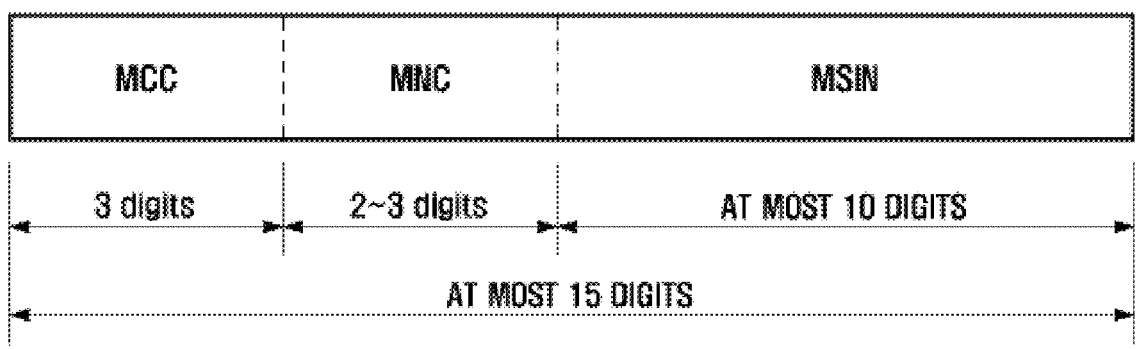
FIG. 2 is a diagram illustrating a structure of an IMSI stored in the SIM card 100 of FIG. 1.

FIG. 2 is a diagram illustrating an exemplary structure of an IMSI stored in the SIM card 100 of FIG. 1.

Referring to FIG. 2, the IMSI is a unique identifier preferably of less than or equal to 15 digits allocated to each mobile subscriber, i.e. SIM card 100. As shown in FIG. 2, the IMSI comprises a three digit Mobile Country Code (MCC), a two or three digit Mobile Network Code (MNC), and a Mobile Station Identifier Number (MSIN), which is less than or equal to ten digits.

The MCC and MNC are used for identifying the subscriber's home network, e.g., Home Public Land Mobile Network (HPLMN), and are uniquely allocated to each network carrier.

When the terminal roams to another network, the roamed network, i.e. the visited network or Visited Public Land Mobile Network (VPLMN) refers to the MCC and MNC (the combination of which are at most 6 digits in this exemplary embodiment) stored in the SIM card 100 for identifying the HPLMN of the terminal 200.

In contrast to the MCC and MNC, which are used for network identification, the MSIN is used for identifying the subscriber.

Among the IMSI codes, the MCC and MNC network identifiers are the most likely to be tampered with. The information used for restricting the use of the terminal with other network carriers (roamed network carriers) is called a SIM lock or network lock information. The network lock information can be composed of the MCC and MNC, sometimes including a part of the MSIN. For example, the MCC, MNC, and a Network Subset Personalization number of two or three digits (e.g., two digits) can be used as the network lock information. Preferably, the network lock information is composed of the MCC and MNC.

As mentioned, the network lock information is used to verify the validity of the SIM card 100 attached to the terminal 200. That is, whether the SIM card 100 attached to a specific carrier-dedicated terminal 200 is valid for the carrier network is verified, using the network lock information.

Referring to FIG. 1, the radio frequency (RF) unit 210 establishes a radio link with the network. The RF unit 210 includes an RF transmitter for up-converting and amplifying transmission signal frequency and an RF receiver for low noise amplifying and down-converting received signal frequency. The RF unit 210 transmits a service request signal to the network and other signals for subscriber identity information and receives signals transmitted by the network. Particularly, the RF unit 210 communicates messages generated during the registration process with the network.

The data processing unit 220 processes the data input through the input unit 270 and received through the RF unit 210. The data processing unit 220 includes a transmitter for encoding and modulating the signal to be transmitted through the RF unit 210 and a receiver for demodulating and decoding the signal received through the RF unit 210. That is, the data processing unit 220 includes a modulator/demodulator (modem) and a coder/decoder (codec).

The control unit 240 controls operations of and signaling among the internal elements of the mobile terminal 200. The control unit 240 may be integrated with the data processing unit 220. Particularly, in an exemplary embodiment, the control unit 240 executes the operation to protect against the unauthorized use of the terminal and services provided through the terminal by tampering with the network lock or SIM lock. That is, the control unit 240 can control the operation of the terminal 200 to restrict the use of the terminal 200 having a tampered network lock and the Temporary Mobile Subscriber Identity (TMSI) allocated to another network carrier.

Particularly, in an exemplary embodiment, when the terminal 200 powers on with the SIM card 100 attached thereto, the control unit 240 compares a TMSI stored in the storage unit 250 and a TMSI stored in the SIM card 100. When the two TMSIs are not identical with each other, the control unit 240 sends a Registration Request message containing the TMSI mismatch information to the network. If a Registration Response message is received in response to the Registration Request message, the control unit 240 restricts the use of the terminal 200 with the SIM card 100.

In an exemplary embodiment, when the terminal 200 powers on with the SIM card 100, the control unit 240 compares the network identity information (e.g., Public Land Mobile Network (PLMN) code) received from the current serving network with the IMSI, particularly, with the MMC and MNC (PLMN code) constituting a portion of the IMSI stored in the SIM card 100. When the two PLMN codes are not identical with each other, the control unit 240 restricts the functions and operations of the terminal 200 attached to the SIM card 100. The network identity information, i.e. the PLMN code, is acquired from the system information message transmitted by the network periodically.

When the two PLMN codes are identical with each other, the control unit 240 compares a Location Information (LOCI) stored in the storage unit 250 and a LOCI stored in the SIM card 100. The LOCI includes the TMSI and a Location Area Identifier (LAI). That is, the control unit 240 compares the TMSI acquired from the LOCI stored in the storage unit 250 and the TMSI provided by the SIM card 100.

When the two TMSIs are identical with each other, the control unit 240 verifies the validity of the TMSI acquired from the LOCI and sends a Registration Request message containing the TMSI to the network. When the two TMSIs are not identical with each other, the control unit 240 verifies the invalidity of the TMSI of the LOCI, deletes the TMSI, and sends a Registration Request message containing the IMSI to the network. The TMSI deletion includes the deletion of the LOCI stored in the storage unit 250 and the LOCI stored in the SIM card 100, and the IMSI included in the Registration Request message can be acquired from the storage unit 250 or the SIM card 100.

If a Registration Accept message is received from the network in response to the Registration Request message containing the TMSI or the IMSI, the control unit 240 enables the function for use in the corresponding service. Otherwise, if a Registration Reject message is received, the control unit 240 disables the function for use in the corresponding service. That is, when an attempt to find a valid TMSI has failed, the control unit 240 sends the Registration Request message containing the IMSI. If it is determined by the network that the SIM card 100 is not one registered with the network, the network sends the Registration Reject message to the terminal 200. Accordingly, the terminal 200 is restricted from accessing the service with the SIM card 100.

For this purpose, the control unit 240 includes an information comparator 242 for comparing the PLMN code stored in the storage unit 250 to the PLMN code stored in the SIM card 100 and to compare the TMSI stored in the storage unit 250 to the TMSI stored in the SIM card 100. The control unit 240 also includes a message generator 244 to generate the Registration Request message containing the TMSI mismatch information and to generate an Identity Response message in response to an Identity Request message received, requesting the terminal send the IMSI information.

The message generator 244 also generates the Registration Request message containing the TMSI when the TMSI stored in the storage unit 250 and the SIM card 100 are identical to each other. Under the control of the control unit 240, the message generator 244 also generates the Registration Request message containing the IMSI when the Temporary Mobile Subscriber Identities (TMSIs) are not identical to each other. The Registration Request message can be replaced with a Location Updating Request message. In such a case, the message generator 244 generates the Location Updating Request message containing the TMSI or IMSI according to whether the TMSIs are identical to each other.

The storage unit 250 stores application programs for the operations of the terminal 200 as well as various data. The storage unit 250 stores SIM card identity information of the SIM card 100 attached to the terminal 200, e.g. Integrated Circuit Card ID (ICCID) and TMSI or P-TMSI, i.e. LOCI allocated by the registered network. The TMSI or P-TMSI allocated by the registered network is stored in the memory chip (not shown) of the SIM card 100 as well as in the storage unit 250.

The display unit 260 displays visual data generated while the terminal 200 runs the programs and data is input through key manipulation. The display unit 260 can be implemented with a Liquid Crystal Display (LCD). When the LCD supports a touchscreen function, the display unit 260 can work as a part of the input unit 270. The display unit 260 also displays alert messages for alerting the user of reception of the messages from the network such as the Registration Reject message.

The input unit 270 receives alphanumeric information and key inputs for setting and executing various functions of the terminal and sends the key sequence to the control unit 240. Preferably, the input unit 270 can be implemented with at least one of a touchpad and a keypad according to the design of the terminal. Optionally, the input unit 270 can be implemented with a remote controller or a voice command device.

An exemplary embodiment of the unauthorized use restriction method using the above structured terminal 200 attached to the SIM card 100 is described hereinafter in further detail.

Figure 3:
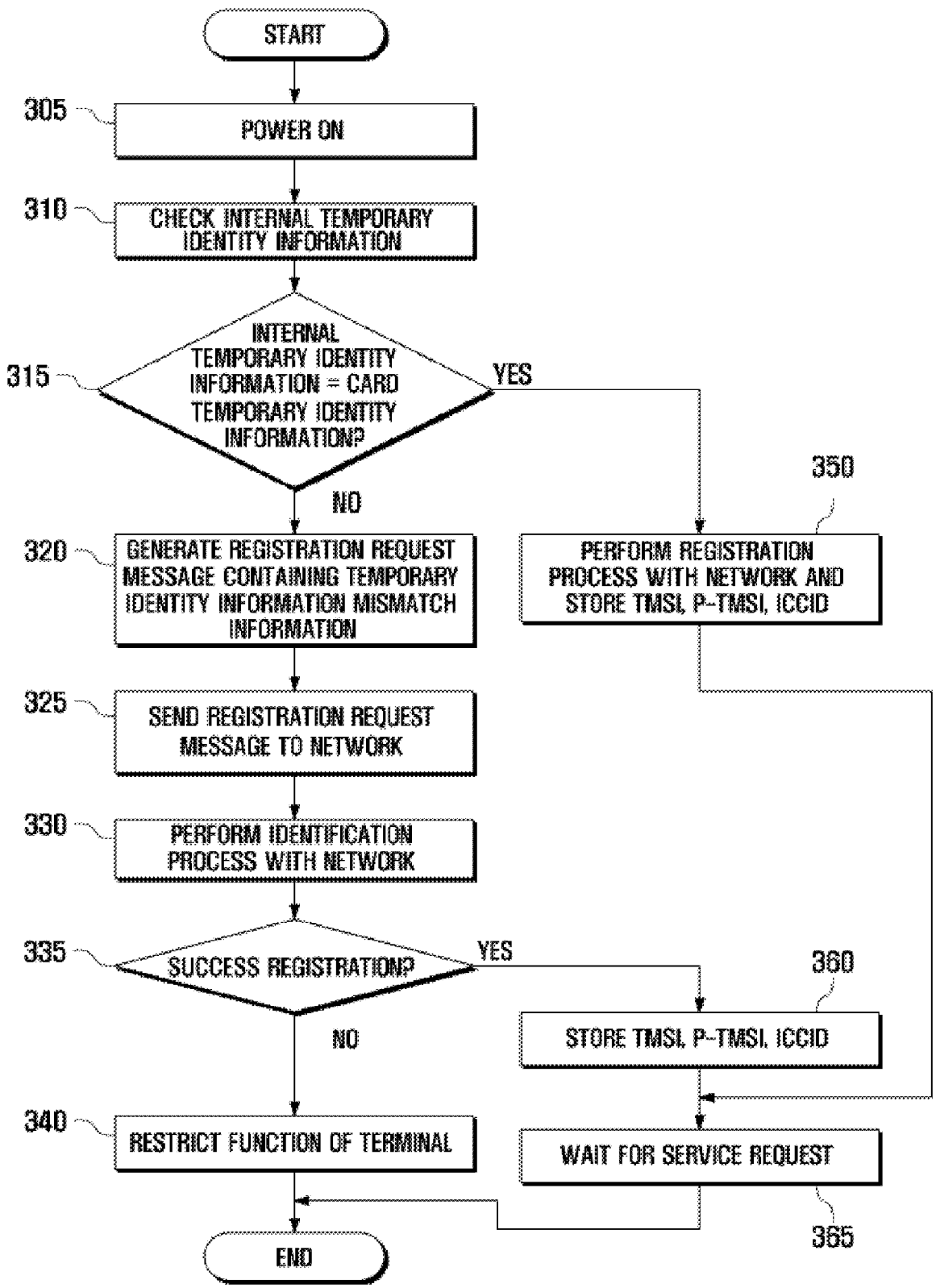
FIG. 3 is a flowchart illustrating a protection method against unauthorized use of a mobile terminal according to an exemplary embodiment of the present invention.

FIG. 3 is a flowchart illustrating a method for protecting against the unauthorized use of a mobile terminal according to an exemplary embodiment of the present invention. In the following description, the terminal may be referred to as a "Mobile Station (MS)" and "User Equipment (UE)" interchangeably.

ted can be a Location Updating Request message or an Attach Request message depending on the network.

That is, in a network supporting both the Circuit Switched (CS) service as a voice call service and the Packet Switched (PS) as a packet data call service, e.g. the Universal Mobile Telecommunications System (UMTS) network, the terminal 200 sends the Attach Request message for registering to both the CS domain for CS services and the PS domain for PS services.

Meanwhile, in a network supporting only the CS service, e.g. the Global System for Mobile Communication (GSM) network, the terminal 200 sends the Location Updating Request message for registering to the CS domain and the Attach Request message for registering to the PS domain.

Table 1 and Table 2 show information elements included in an exemplary Location Updating Request message and an exemplary Attach Request message containing the TMSI mismatch information, respectively.

TABLE 1

| IEI | Information Element | Type | Presence | Format | Length |
|---|---|---|---|---|---|
|  | Mobility Management protocol discrimination | Protocol Discriminator | M | V | ½ |
|  | Skip Indicator | Skip Indicator | M | V | ½ |
|  | Location Updating Request message type | Message type | M | V | 1 |
|  | Location updating type | Location updating type | M | V | ½ |
|  | Ciphering key sequence number | Ciphering key sequence number | M | V | ½ |
|  | Location area identification | Location area identification | M | V | 5 |
|  | Mobile Station classmark | Mobile Station classmark 1 | M | V | 1 |
|  | Mobile identity | Mobile identity | M | LV | 2-9 |
| 33 | Mobile Station classmark for UMTS | Mobile Station classmark 2 | O | TLV | 5 |
| XX | RPLMN | RPLMN | O | LV | 4 |
| XX | TMSI status | TMSI status | O | TV | 1 |

Referring to FIG. 3, once the terminal 200 powers on with the SIM card 100 (S305), the control unit 240 reads an internal TMSI, i.e. the TMSI or P-TMSI stored in the storage unit 250 and a card TMSI, i.e. the TMSI or P-TMSI stored in the SIM card (S310) and determines whether the internal TMSI and the card TMSI are identical with each other (S315). If the two TMSIs are identical to each other, the process goes to step S350; and otherwise, the process goes to step S320.

When the two TMSIs are not identical to each other, e.g. when the terminal 200 has never been used with the SIM card 100, the control unit 240 detects the TMSI mismatch. The control unit 240 also can compare the Integrated Circuit Card ID (ICCID) of the SIM card 100 and the ICCID stored in the storage unit 250 before comparing the internal TMSI and the card TMSI.

In general, the ICCID of the SIM card 100 is read out and stored into the storage unit 250 when the terminal 200 registers with the network successfully. Accordingly, the control unit 240 can check whether the SIM card 100 attached to the terminal 200 has been changed through the ICCID comparison process. Even when it is determined that the SIM card 100 has been changed through the ICCID comparison process, the control unit 240 regards the ICCID mismatch as the TMSI mismatch.

At step S320, the control unit 240 generates a Registration Request message containing the TMSI mismatch information. Here, the Registration Request message to be transmit- As shown in Table 1, the Location Updating Request message includes Information Elements (IEs) such as the Registered Public Land Mobile Network (RPLMN) and TMSI status for restricting unauthorized use of the terminal 200.

In more detail, the Location Updating Request message includes a Mobility Management Protocol Discriminator IE of ½ byte (4 bits) as mandatory (M) IE for identifying the standard layer 3 protocol message, a Skip Indicator IE of ½ byte as mandatory IE for indicating the message to be ignored, a Location Updating Request message type IE of 1 byte as mandatory IE for indicating the Location Updating Request message, a Location Updating type IE of ½ byte as mandatory IE for indicating whether the Location Updating Request message is of requesting normal registration, periodic registration, or IMSI connection, a Ciphering key sequence number IE of ½ byte as mandatory IE for indicating a ciphering key, a Location Area Identification IE of 5 bytes as mandatory IE for identifying the Area, a Mobile Station classmark IE of 1 byte as mandatory IE providing high priority information, a Mobility Identity IE of 2-9 bytes as mandatory IE for indicating identity information such as IMSI or TMSI, a Mobile Station classmark for Universal Mobile Telecommunications System (UMTS) IE of 5 bytes as optional (O) IE for providing high and low priority information to UMTS, a RPLMN IE of 4 bytes as optional IE for indicating registered network information, and a TMSI status IE of 1 byte as optional IE for indicating TMSI mismatch.

TABLE 2

| IEI | Information Element | Type | Presence | Format | Length |
|---|---|---|---|---|---|
| | Protocol discriminator | Protocol Discriminator | M | V | ½ |
| | Skip Indicator | Skip Indicator | M | V | ½ |
| | Attach request message identity | Message type | M | V | 1 |
| | MS network capability | MS network capability | M | LV | 3-9 |
| | Attach type | Attach type | M | V | ½ |
| | GPRS ciphering key sequence number | Ciphering key sequence number | M | V | ½ |
| | DRX parameter | DRX parameter | M | V | 2 |
| | P-TMSI or IMSI | Mobile identity | M | LV | 6-9 |
| | Old routing area identification | Routing area identification | M | V | 6 |
| | MS Radio Access capability | MS Radio Access | M | LV | 6-52 |
| 19 | Old P-TMSI signature | P-TMSI signature | O | TV | 4 |
| 17 | Requested READY timer value | GPRS Timer | O | TV | 2 |
| XX | TMSI status | TMSI status | O | TV | 1 |

As shown in Table 2, the Attach Request message is a message sent to the PS domain when requesting registration to both the CS domain and the PS domain. In order to register with the CS and PS domains simultaneously, the Attach Request message further includes the RPLM IE shown in Table 1.

In more detail, the Attach Request message includes a Protocol Discriminator IE of ½ byte (4 bits) as mandatory IE for identifying the standard layer 3 protocol message, a Skip Indicator IE of ½ byte as mandatory IE for indicating the message to be ignored, an Attach Request message identity IE of 1 byte as mandatory IE for indicating the Attach Request message, a Mobile Station (MS) network capability IE of 3 to 9 bytes as mandatory IE for indicating the MS network capability in association with General Packet Radio Services (GPRS), an Attach type IE of ½ byte as mandatory IE for indicating the attach type, i.e., whether the MS requests for the GPRS or the combined GPRS, a GPRS ciphering key sequence number IE of ½ byte as mandatory IE containing GPRS Ciphering key sequence number, a DRX parameter IE of 2 bytes as mandatory IE included when the MS changes connection from a GSM network to an UMTS network or the MS provides new discontinuous reception (DRX) parameters to network, a P-TMSI or IMSI IE of 6 to 9 bytes as mandatory IE for indicating Mobile Identity such as P-TMSI or IMSI, an Old Routing area identification IE of 6 bytes as mandatory IE for identifying a routing area, an MS radio Access capability IE of 6 to 52 bytes as mandatory IE for indicating the MS's radio capability, an Old P-TMSI signature of 4 bytes as optional IE added when the terminal receives an Attach Accept message or Routing Area Update Accept message from the network, a Requested READY timer value IE of 2 bytes as optional IE for indicating a preference value to the READY timer, and a TMSI status IE of 1 byte as optional IE for indicating TMSI mismatch.

As mentioned, when the Registration Request message is requesting to register with the CS domain and PS domain simultaneously, the RPLMN shown in Table 1 is added to Table 2.

Particularly, in an exemplary embodiment, the Registration Request message includes a specific IE for asking the network to perform an Identification process when the TMSI mismatch is detected. That is, the terminal 200 sends the network the Registration Request message having an RPLMN IE and a TMSI status IE as shown in Tables 1 and 2 such that the identification process is performed by the network. Tables 3 and 4 show the detailed structures of the RPLMN IE and the TMSI status IE, respectively.

TABLE 3

| Bit | | | | | | | | |
|---|---|---|---|---|---|---|---|---|
| 8 | 7 | 6 | 5 | 4 | 3 | 2 | 1 | Octet |
| RPLMN IEI | | | | | | | | 1 |
| MCC digit 2 | | | | MCC digit 1 | | | | 2 |
| MNC digit 3 | | | | MCC digit 3 | | | | 3 |
| MNC digit 2 | | | | MNC digit 1 | | | | 4 |

As shown in Table 3, the RPLMN IE is 4 octets long (4 bytes). The RPLMN IE is composed of a RPLMN Information Element Identifier (IEI) (the first octet), MCC information (the second octet and first 4 bits of the third octet), and MNC information (last 4 bits of the third octet and the fourth octet). The current serving network can acquire information on the previous serving network using the MCC and MNC information, i.e. the network with which the terminal 200 had registered and allocated the TMSI, based on the MCC and MNC information included in the RPLMN IE.

TABLE 4

| Bit | | | | | | | | |
|---|---|---|---|---|---|---|---|---|
| 8 | 7 | 6 | 5 | 4 | 3 | 2 | 1 | Octet |
| TMSI status IEI | | | | Spare | | | TMSI flag | 1 |

As shown in Table 4, the TMSI status IE is 1 octet long and composed of a TMSI flag (the first 1 bit), spare bits filled with "0" (the second to fourth bits), a TMSI status IEI (the fifth to eighth bits). If the TMSI flag has been set to 1 in the Location Updating Request message or the Attach Request message, it indicates TMSI mismatch, i.e. that no valid TMSI is available. Accordingly, the network which receives such a Location Updating Request message or such an Attach Request message performs a subscriber identification process with the terminal 200.

Returning to FIG. 3, after generating the Registration Request message containing the TMSI mismatch information at step S320, the control unit 240 sends the Registration Request message to the network (S325). Next, the control unit 240 performs an identification process with the reception of an Identity Request message transmitted by the network in response to the Registration Request message (S330).

If the terminal is identified as a valid terminal 200 in the identification process, the control unit 240 performs an authentication process with the network. Otherwise, if the terminal 200 is identified as an invalid terminal, e.g. a terminal attached to a tampered SIM card, the registration request is rejected. The registration procedure is described later in more detail with reference to FIG. 4 and FIG. 5.

After completing the identification process, the control unit 240 determines whether the mobile terminal 200 is successfully registered with the network by checking the registration response message transmitted by the network (S335). The registration response message can be a Registration Accept message including the Location Update Accept message or the Attach Accept message or a Registration Reject message including the Location Update Reject message and Attach Reject message.

If the Location Update Accept message or the Attach Accept message is received, then the control unit 240 determines that the terminal 200 is successfully registered with the network, such that the process goes to step S360. Otherwise, if the Location Update Reject message or the Attach Reject message is received, the control unit 240 determines that the terminal 200 fails registration with the network, such that the process goes to step S340.

At step S340, the control unit 240 displays an alert message on the display unit 250 of the mobile terminal 200 for alerting the user of unauthorized use of the mobile terminal 200 and restricts preset functions of the terminal. The functions restricted against unauthorized use can be set in the manufacturing phase of the terminal to prevent the terminal from being used without authorization with a SIM card owned by another network carrier subscriber.

If the internal TMSI and the card TMSI are identical to each other at step S315, then the control unit 240 performs a normal registration process with the network and stores the TMSI or P-TMSI allocated by the network into the storage 250 as well as into the SIM card 100 (S350). At this time, the control unit 240 may store the ICCID acquired from the SIM card 100 into the storage unit 250. The ICCID copied into the storage unit 250 is used, when the terminal 200 powers on with a SIM card, to check whether a change of SIM card has occurred. In the case where the TMSI or P-TMSI is reallocated, the new TMSI or P-TMSI is received through the Location Update Accept message or the Access Accept message transmitted by the network. Once the mobile terminal 200 is successfully registered with the network, the control unit 240 waits for a service request event (S365).

Also, if the mobile terminal 200 is successfully registered with the network at step S335, the control unit 240 stores the TMSI or P-TMSI allocated by the network into the storage 250 and the SIM card 100 (S360). At this time, the control unit 240 may store the ICCID acquired from the SIM card into the storage unit 250. Next, the control unit 240 waits for a service request event (S365).

Although not depicted in FIG. 3, the protection method against unauthorized use may include a PLMN code comparison procedure described later with reference to FIGS. 7, 8 and 9. That is, when the terminal 200 powers on, the control unit 240 can compare the network identity information received from the network, i.e. PLMN code, with the PLMN code of the IMSI stored in the SIM card 100, and can restrict the use of the terminal 200 or perform step S310 depending on the comparison result. The PLMN code comparison procedure is described in more detail with reference to FIG. 7, FIG. 8 and FIG. 9.

The registration procedure including a terminal identification process between the terminal and the network will now be described in greater detail with reference to FIG. 4 and FIG. 5.

Figure 4:
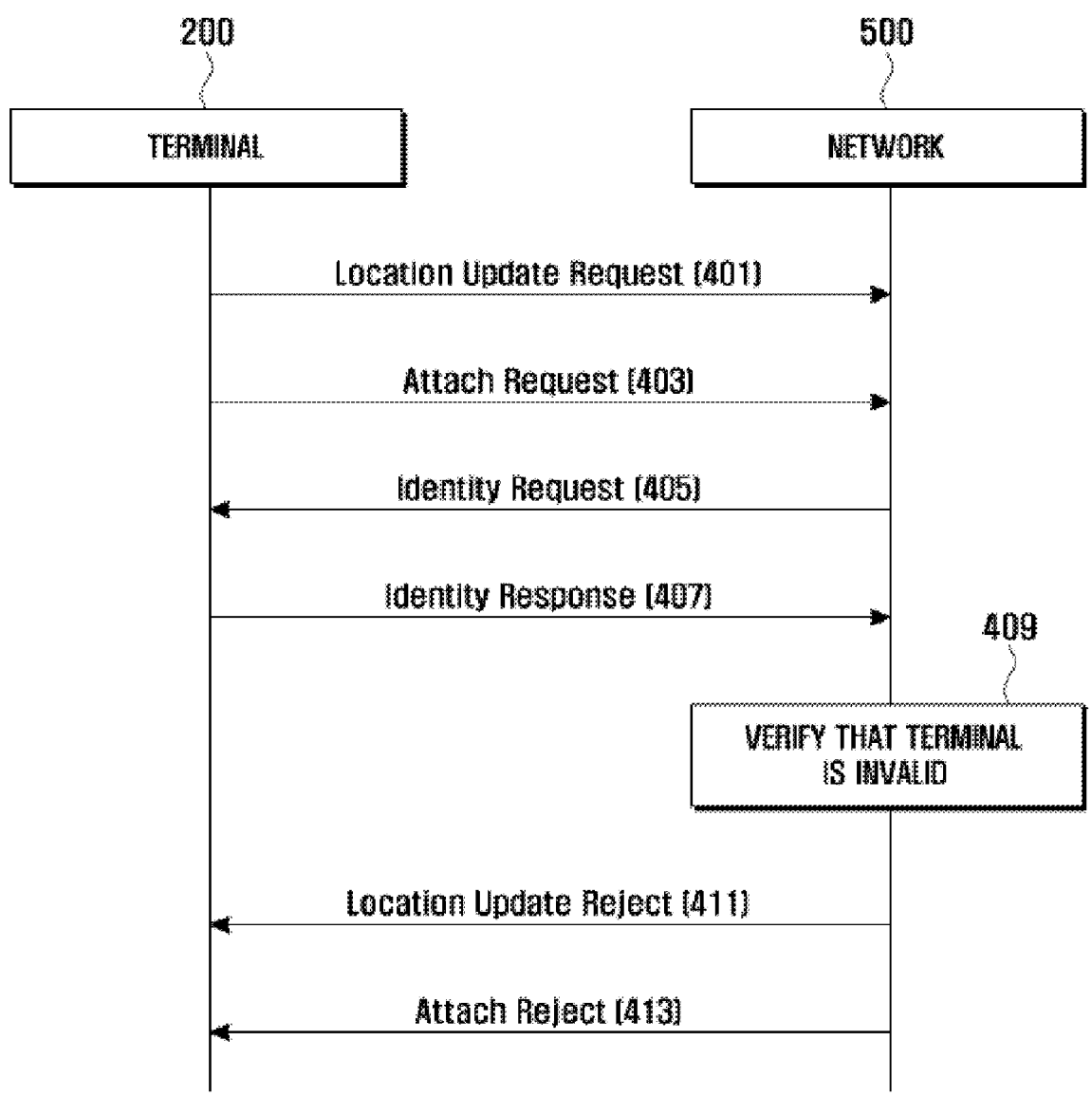
FIG. 4 is a message flow diagram illustrating steps of a registration procedure of the protection method of FIG. 3 when the SIM card attached to the terminal is invalid.
Figure 5:
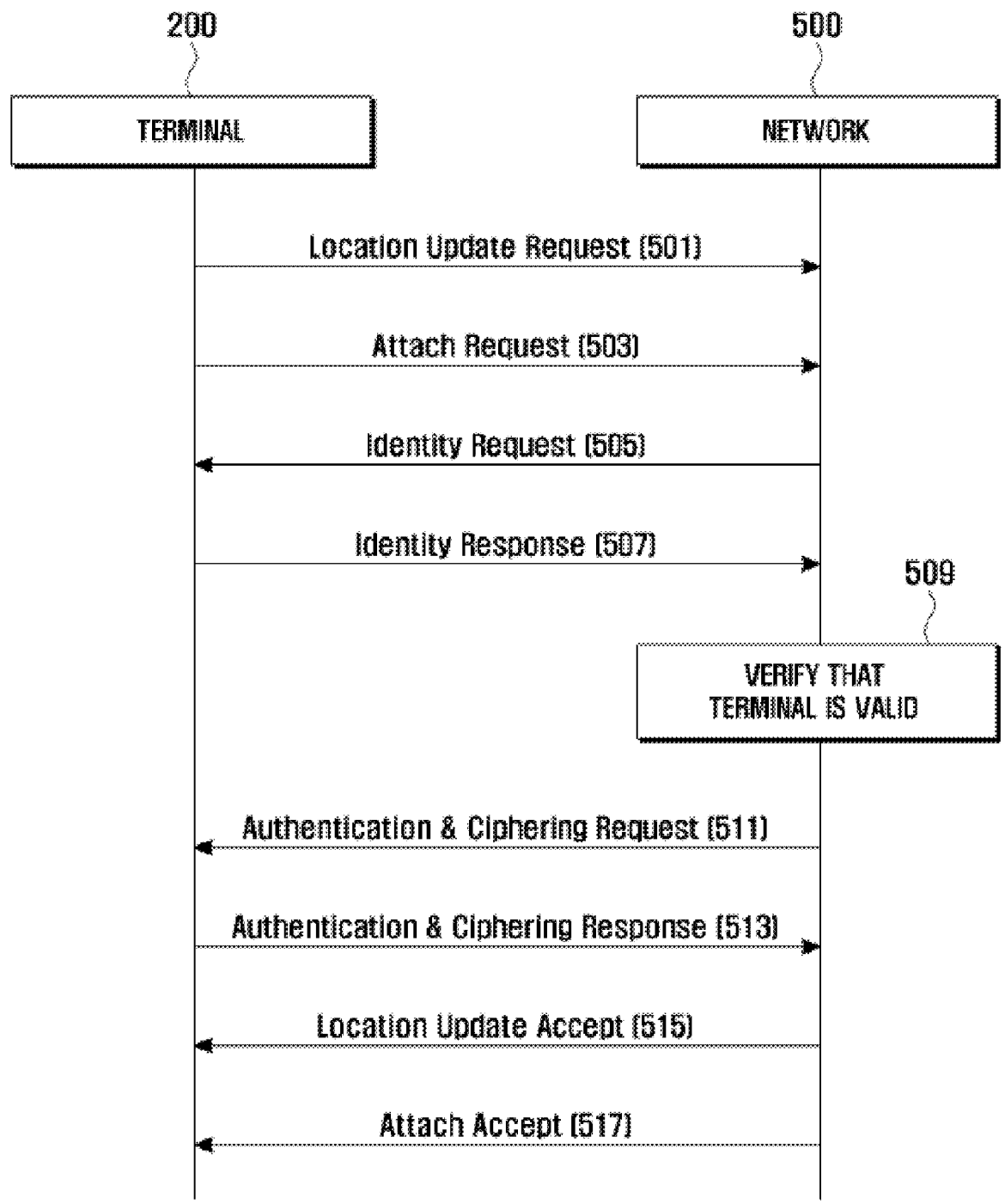
FIG. 5 is a message flow diagram illustrating steps of a registration procedure of the protection method of FIG. 3 when the terminal is identified as a valid terminal.

FIG. 4 shows the registration procedure when an invalid SIM card is attached to the terminal and FIG. 5 shows the registration procedure when a valid SIM card is attached to the terminal.

FIG. 4 is a message flow diagram illustrating steps of a registration procedure of the unauthorized use prevention method (method of protection against unauthorized use) of FIG. 3 when the SIM card attached to the terminal is invalid.

Referring to FIG. 4, once it is determined that the internal TMSI stored in the storage unit 250 of the terminal 200 and the card TMSI stored in the SIM card 100 attached to the terminal 200 are different from each other, the terminal 200 generates a Location Update Request message and an Attach Request message containing the TMSI mismatch information indicated by RPLMN IE (see Table 3) and TMSI status IE (see Table 4).

Next, the terminal 200 sends the Location Update Request message (S401) and the Attach Request message to the network 500 (S403). The Location Update Request message is used for requesting registration to a CS domain, and the Attach Request message is used for requesting registration to a PS domain.

FIG. 4 shows the message flows between the terminal 200 and the network 500 under the assumption that the network 500 requires registration to both the CS and PS domains. If the network 500 supports the simultaneous registration to both the CS and PS domains, the transmission of the Location Update Request message is skipped.

Upon receipt of the messages containing the TMSI mismatch information, the network 500 sends an Identity Request message to the terminal 200 for identifying the terminal 200 (S405). The Identity Request message is structured in the message format defined in the international standard, whereby further detailed description of the Identity Request message is omitted in the present disclosure.

Upon receipt of the Identity Request message, the terminal 200 sends an Identity Response message containing its identity information to the network 500 (S405). The identity information contained in the Identity Response message is the IMSI read from the SIM card 100 attached to the terminal 200.

Upon receipt of the Identity Response message, the network 500 compares the IMSI extracted from the Identity Response message and the IMSI registered with a Home Location Register (HLR) (stored in the network 500) and determines whether the terminal 200 is valid (S409). FIG. 4 depicts a configuration where the two IMSIs differ from each other such that the terminal 200 is determined to be an invalid terminal (S409).

The network 500 determines that the terminal 200 is an invalid terminal (S409). That is, the network 500 regards that the terminal 200 is used without authorization, e.g., equipped with a tampered SIM card. Once the network 500 determines that the terminal 200 is an invalid terminal, the network 500 sends a Location Update Reject message to the terminal 200 in response to the Location Update Request message (S411). Also, the network 500 sends an Attach Reject message to the terminal 200 in response to the Attach Request message (S413).

If the network 500 supports the simultaneous registration to both the CS and PS domains, the transmission of the Location Update Reject message can be skipped.

The Identity Response message, Location Update Reject message, and Attach Reject message are structured in the message formats defined in the international standard, whereby further detailed descriptions of these messages are omitted in the present description.

FIG. 5 is a message flow diagram illustrating steps of a registration procedure of the unauthorized use prevention method of FIG. 3 when the terminal is identified as a valid terminal.

Referring to FIG. 5, once it is determined that the internal TMSI stored in the storage unit 250 of the terminal 200 and the card TMSI stored in the SIM card 100 attached to the terminal 200 are different from each other, the terminal 200 generates a Location Update Request message and an Attach Request message containing the TMSI mismatch information indicated by RPLMN IE (see Table 3) and TMSI status IE (see Table 4).

Next, the terminal 200 sends the Location Update Request message (S501) and the Attach Request message to the network 500 (S503). The Location Update Request message is used for requesting registration to a CS domain, and the Attach Request message is used for requesting registration to a PS domain.

FIG. 5 shows the message flows between the terminal 200 and the network 500 under the assumption that the network 500 requires registration to both the CS and PS domains. If the network 500 supports the simultaneous registration to both the CS and PS domains, the transmission of the Location Update Request message can be omitted.

Upon receipt of the messages containing the TMSI mismatch information, the network 500 sends an Identity Request message to the terminal 200 for identifying the terminal 200 (S505).

Upon receipt of the Identity Request message, the terminal 200 sends an Identity Response message containing its identity information to the network 500 (S507). The identity information contained in the Identity Response message is the IMSI read from the SIM card 100 attached to the terminal 200.

Upon receipt of the Identity Response message, the network 500 compares the IMSI extracted from the Identity Response message to the IMSI registered with a Home Location Register (HLR) (stored in the network 500) and determines whether the terminal 200 is valid (S509). FIG. 5 shows the configuration when the two IMSIs are identical with each other such that the terminal 200 is determined to be a valid terminal (S509).

Once it is determined that the terminal 200 is a valid terminal at step S509, the network 500 sends an Authentication & Ciphering Request message to the terminal 200 for the location update process requested by the terminal 200 (S511). Upon receipt of the Authentication & Ciphering Request message, the terminal 200 sends an Authentication & Ciphering Response message to the network in response to the Authentication & Ciphering Request message (S513).

With the exchange of the Authentication & Ciphering Request message and Authentication & Ciphering Response message, the network 500 performs the authentication and ciphering configuration for providing the terminal with the service. Once the terminal 200 is successfully registered with the network 500 through the authentication and ciphering process, the network 500 sends the terminal 200 a Location Update Accept message indicating the successful registration with the CS domain in response to the Location Update Request message (S515). If a new TMSI is allocated by the network 500, the Location Update Request message to the terminal 200 contains the new TMSI.

Additionally, the network 500 sends the terminal 200 an Attach Accept message indicating the successful registration to the PS domain in response to the Attach Request message (S517).

If the network 500 supports the simultaneous registration to both the CS and PS domains, the transmission of the Location Update Accept message is omitted.

The Identity Request message, Identity Response message, Authentication & Ciphering Request message, Authentication & Ciphering Response message, Location Update Accept message, and Attach Accept message are structured in the message formats defined in the international standard, whereby further detailed descriptions of these messages are omitted here.

Figure 6:
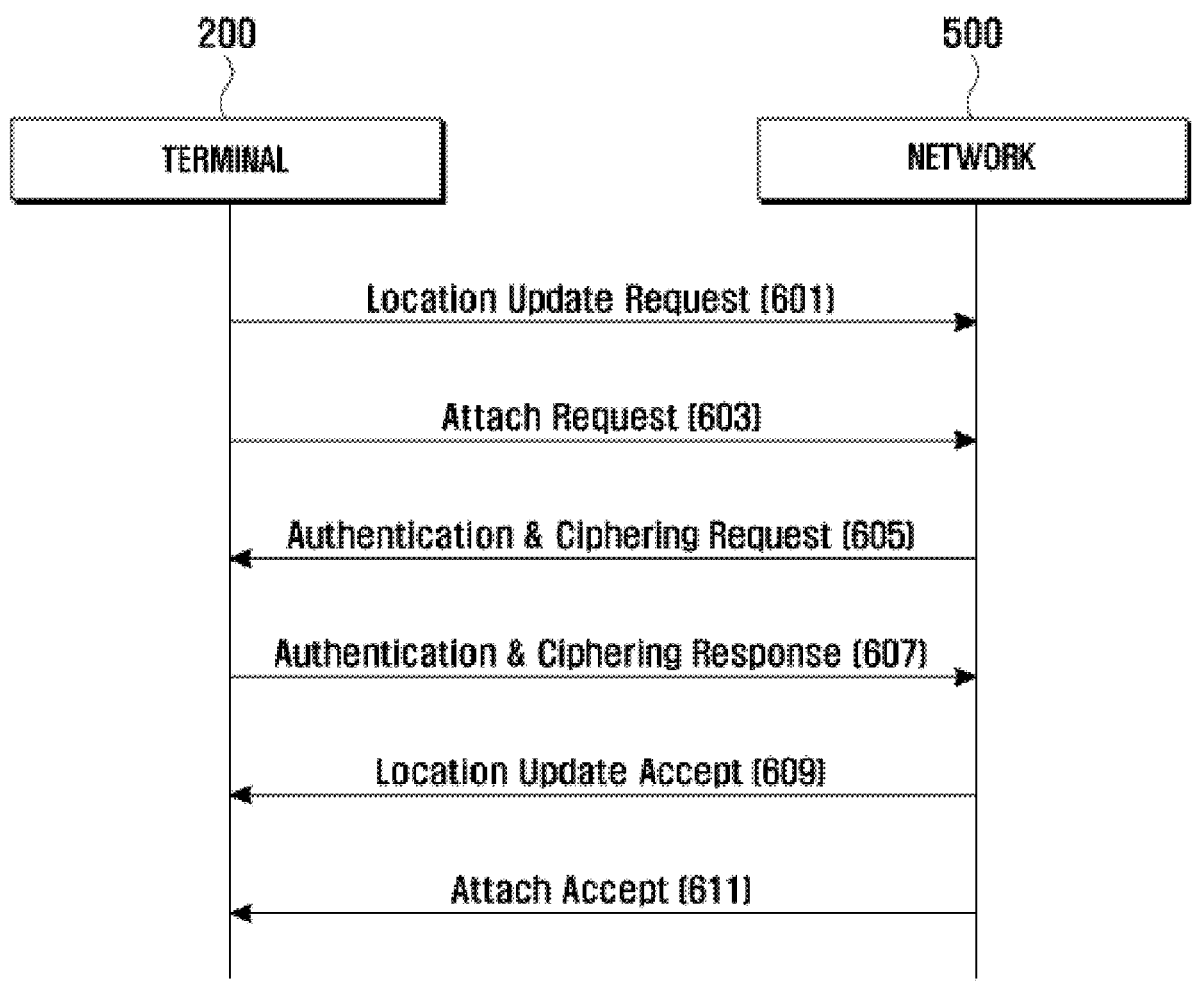
FIG. 6 is a message flow diagram illustrating steps of a normal registration procedure of the protection method of FIG. 3.

FIG. 6 is a message flow diagram illustrating steps of a normal registration procedure of the unauthorized use prevention method of FIG. 3.

Referring to FIG. 6, once it is determined that the internal TMSI stored in the storage unit 250 of the terminal 200 and the card TMSI stored in the SIM card 100 attached to the terminal 200 are identical with each other, the terminal 200 generates a Location Update Request message and an Attach Request message. In this case, since the two TMSIs are identical to each other, the Location Update Request message and Attach Request message do not carry the TMSI mismatch information.

Next, the terminal 200 sends the Location Update Request message (S601) and the Attach Request message to the network 500 (S603). The Location Update Request message is used for requesting registration to a CS domain, and the Attach Request message is used for requesting registration to a PS domain.

FIG. 6 shows the message flows between the terminal 200 and the network 500 under the assumption that the network 500 requires registration to both the CS and PS domains. If the network 500 supports the simultaneous registration to both the CS and PS domains, the transmission of the Location Update Request message is skipped.

Upon receipt of the messages having no TMSI mismatch information, the network 500 sends an Authentication & Ciphering Request message to the terminal 200 for the location update process requested by the terminal 200 (S605). Upon receipt of the Authentication & Ciphering Request message, the terminal 200 sends an Authentication & Ciphering Response message to the network 500 in response to the Authentication & Ciphering Request message (S607).

Once the terminal 200 is registered with the network 500 successfully through the authentication and ciphering process, the network 500 sends the terminal 200 a Location Update Accept message indicating the successful registration with the CS domain in response to the Location Update Request message (S609). At step S609, if a new TMSI is allocated by the network 500, the Location Update Accept message contains the new TMSI.

The network 500 also sends the terminal 200 an Attach Accept message indicating the successful registration to the PS domain in response to the Attach Request message (S611). If the network 500 supports the simultaneous registration to both the CS and PS domains, the transmission of the Location Update Accept message is skipped.

As described above, the protection method against unauthorized use for a mobile terminal according to the exemplary embodiments can protect the terminal attached to a tampered SIM card from being used without authorization. For this purpose, the terminal according to an exemplary embodiment of the present invention compares the internal TMSI stored in the storage unit and the card TMSI stored in the SIM card and sends, when the two TMSIs differ from each other, a registration request message (Location Update Request message and/or Attach Request message) containing the TMSI mismatch information to the network to trigger a terminal identification process with a tamper-proof identity information.

At this time, the Registration Request message is transmitted when the Location Area Identifier (LAI) or a Routing Area Identifier (RAI) changes due to movement of the terminal or a predetermined timer expires, as well as when the terminal powers on with the SIM card.

The change of the LAI or RAI can be detected by checking the information stored in a System Information Block (SIB) of the System Information message broadcasted by the network periodically. In the case of using the timer, the terminal starts the timer when a Registration Accept message (Location Update Accept message and/or Attach Accept message) is received. When the timer expires, the terminal resends the Registration Request message (Location Update Request message and/or Attach Request message).

The Registration Request message can be at least one of the Location Update Request message for registration to the CS domain and the Routing Update Request message, i.e., the Attach Request message, for registration to the PS domain. The Location Update Request message is structured in the exemplary format of Table 1, and the Routing Update Request message is structured in the exemplary format of Table 2.

In the case where the LAI or RAI changes or the time expires, the terminal compares the internal TMSI and the card TMSI as shown in steps S310 and S315 of FIG. 3. If the two TMSIs differ from each other, the terminal sends the network a Registration Request message containing the TMSI mismatch information indicated by the PLMN IE as shown in Table 3 and/or the TMSI status IE as shown in Table 4. Otherwise, if the two TMSIs are identical with each other, the terminal sends the Registration Request message without TMSI mismatch information to the network and performs the network registration process as shown in FIG. 3 (S350).

In the above described manner, the mobile terminal can be protected from being used without authorization with the SIM card containing a tampered IMSI.

As described above, the terminal compares the internal TMSI and the card TMSI. When the two TMSIs differ from each other, the terminal sends a Registration Request message such as the Location Update Request message and the Attach Request message containing the TMSI mismatch information to the network. The network which receives the Registration Request message requests from the terminal the IMSI that is uniquely allocated to the terminal according to the TMSI mismatch information such that the terminal registration process is performed with the unique IMSI.

A simplified method of protection against unauthorized use for a mobile terminal according to an exemplary embodiment of the present invention is described hereinafter. In an exemplary embodiment, the terminal verifies the validity of the TMSI by comparing the TMSIs stored in the storage unit and the SIM card and sends the Registration Request message containing the TMSI or IMSI to the network depending on the comparison result, and the network determines whether to register the terminal based on the TMSI or IMSI received from the terminal.

Preferably the protection method protects the terminal from being used without authorization such as through the hacking of the network lock/SIM lock and the TMSI allocated by another network carrier. For this purpose, the protection against unauthorized use method according to an exemplary embodiment of the present invention allows the network to identify the subscriber by checking the IMSI of the terminal.

The terminal stores the TMSI to the internal TMSI whenever a registration process has been completed successfully and sends the IMSI to the network through a Registration Request message when the card TMSI (if it is verified as the valid card TMSI in the TMSI verification process) differs from the internal TMSI. Another exemplary embodiment of a protection against unauthorized use method of a terminal attached to a SIM card is now described hereinafter.

Figure 7:
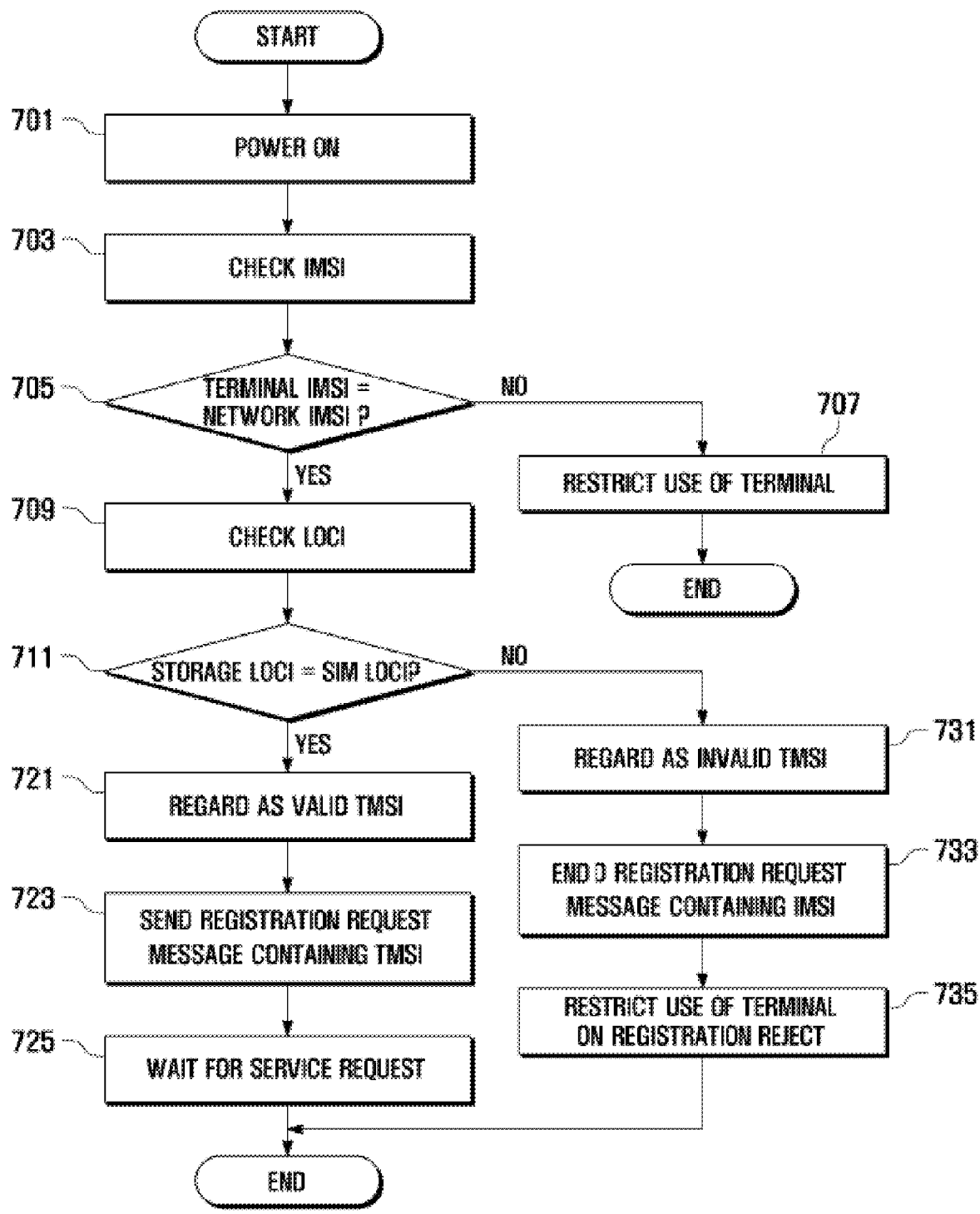
FIG. 7 is a flowchart illustrating a protection method for a mobile terminal according to another exemplary embodiment of the present invention.

FIG. 7 is a flowchart illustrating a protection method against an unauthorized use for a mobile terminal according to another exemplary embodiment of the present invention.

Referring to FIG. 7, once the terminal 200 powers on with a Subscriber Identity Module (SIM) card 100 (S701), the control unit 240 of the terminal 200 (FIG. 1) reads the International Mobile Subscriber Identity (IMSI) (FIG. 2) from the SIM card 100 (S703) and determines whether the IMSI is identical with network identity information of a subscriber's home network (S705). That is, the control unit 240 compares the network identity information received from the current network right after the power-on of the terminal 200 and the network identity information read from the SIM card 100. The network identity information can be a Public Land Mobile Network (PLMN) code composed of the Mobile Country Code (MCC) and the Mobile Network Code (MNC) derived from the IMSI.

If the two instances of the network identity information, particularly the PLMN codes differ from each other, the process goes to step S709; otherwise, the process goes to step S707.

At step S707, the control unit 240 restricts use of the terminal 200 based on the mismatch of the two PLMN codes. At this time, the control unit 240 displays an alert notice of unauthorized use of the terminal on the display unit 260 and restricts predetermined functions such as a communication function. The functions restricted against unauthorized use can be set in the manufacturing phase of the terminal to prevent the terminal from unauthorized use, such as with a SIM card owned by another network carrier subscriber.

If it is determined that the two PLMN codes are identical with each other, the control unit 240 reads the Location Information (LOCI) which includes the Temporary Mobile Subscriber Identity (TMSI) and the Location Area Identifier (LAI) from the SIM card 100 (S709) and determines whether the LOCI read from the SIM card is identical to the LOCI read from the storage unit 250 (S711). That is, the control unit 240 verifies the validity of the TMSI stored in the SIM card 100. If the two LOCIs are identical to each other, the process goes to step S721; otherwise, the process goes to step S731.

As mentioned, the LOCI is preferably composed of the TMSI and the LAI, and the control unit 240 extracts the TMSI from the LOCI and verifies the extracted TMSI (S709 and S711). The control unit 240 stores the LOCI into the storage unit 250 whenever the terminal 200 is successfully registered with the network 500 (FIG. 8).

If it is determined that the two LOCIs are identical with each other at step S711, the control unit 240 determines that the LOCI stored in the SIM card 100, particularly, the TMSI derived from the LOCI (S721) is valid and sends a Registration Request message containing the verified TMSI to the network 500 (S723). As aforementioned, the Registration Request message can be a Location Update Request message and/or an Attach Request message. Once the terminal 200 is successfully registered with the network 500 through the above described registration process, the control unit 240 waits for receiving a user's service request.

In accordance with an exemplary embodiment, the TMSI allocated by the network 500 is stored into the storage unit 250 as well as in the SIM card 100 by the control unit 240. The control unit 240 sends the Registration Request message containing the IMSI when it is determined, in a subsequent registration process that the TMSI stored in the SIM card differs from the TMSI stored in the storage unit 250.

If it is determined that the two LOCIs differ from each other at step S711, the control unit 240 regards the LOCI stored in the SIM card 100, particularly, the TMSI derived for the LOCI, is invalid (S731). In this case, the control unit 240 deletes the invalid TMSI. Next, the control unit 240 sends a Registration Request message containing the IMSI to the network (S733). At this time, the control unit 240 can read the IMSI from the SIM card 100 or the storage unit 250. As aforementioned, the Registration Request message can be the Location Update Request message and/or the Access Request message.

Upon receipt of a Registration Reject message from the network 500 in response to the Registration Request message, the control unit 240 restricts the use of the terminal 200 connected to the SIM card 100 (S735). At this time, the control unit 240 controls the message generator 244 to display an alert message on the display unit 260 notifying the user of the invalid SIM card and the control unit 240 restricts predetermined functions such as the communication function of the terminal 200. As aforementioned, the Registration Reject message can be a Location Update Reject message and/or an Attach Reject message.

The registration procedure between the terminal 200 and network 500 is described in more detail with reference to FIGS. 8 and 9. FIG. 8 shows the registration procedure when a valid SIM card 100 is attached to the terminal 200 and FIG. 9 shows the registration procedure when an invalid SIM card 100 is attached to the terminal 200.

Figure 8:
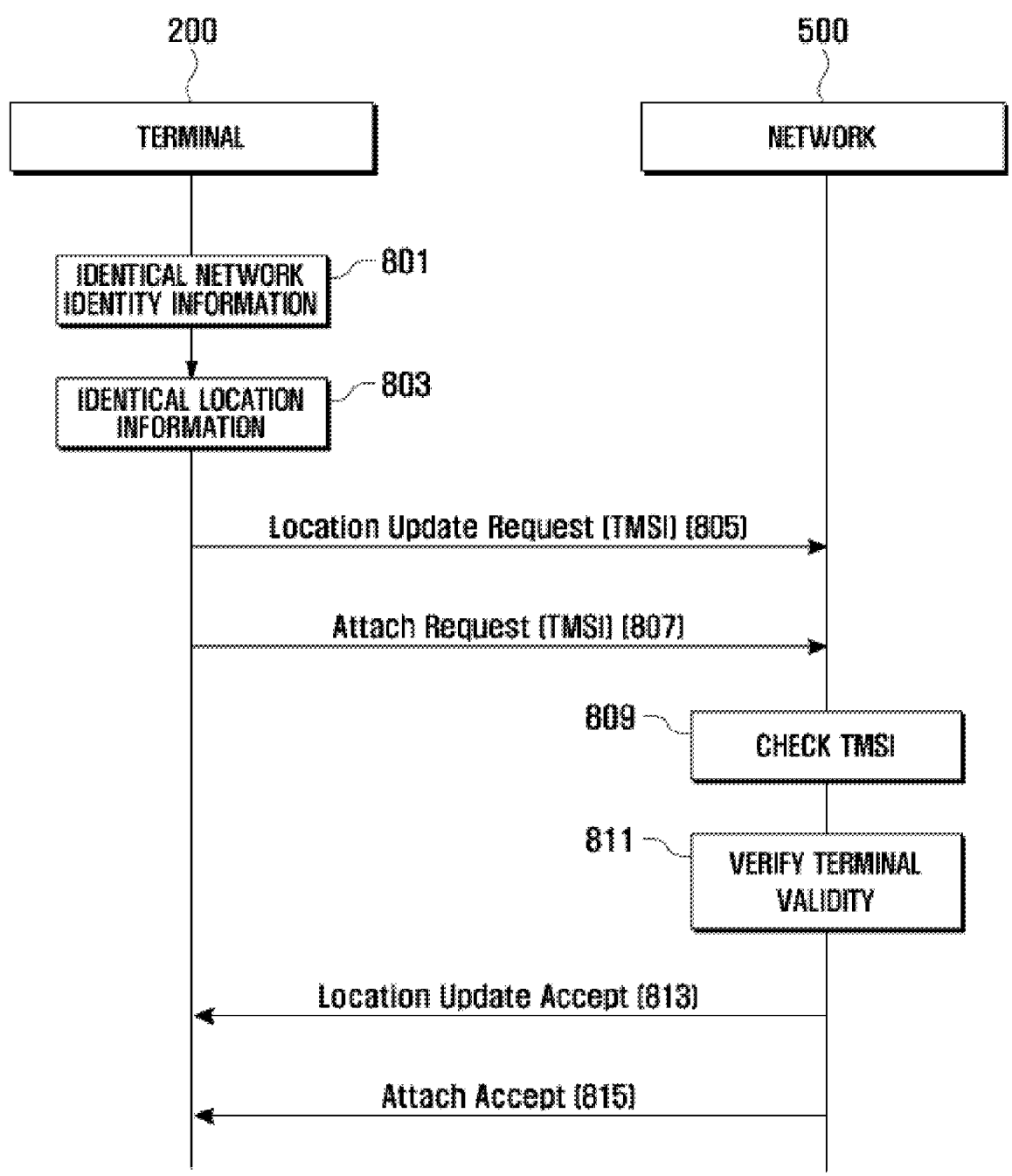
FIG. 8 is a message flow diagram illustrating steps of a registration procedure of the protection method of FIG. 7 when the SIM card attached to the terminal is valid.

FIG. 8 is a message flow diagram illustrating steps of a registration procedure of the unauthorized use protection method of FIG. 7 when the SIM card 100 attached to the terminal 200 is valid.

Referring to FIG. 8, the terminal 200 checks that the network identity information stored in the SIM card 100 and the network identity information received from the network 500 are identical to each other (S801). The terminal 200 also checks that the location information (i.e., the TMSI) stored in the SIM card 100 and the location information (TMSI) stored in the storage unit 250 are identical to each other (S803). In this case, the terminal 200 generates a Registration Request message, i.e. Location Update Request message and Attach Request message containing the TMSI.

Next, the terminal 200 sends the Location Update Request message containing the TMSI (S805) and sequentially the Attach Request message containing the TMSI to the network 500 (S807). Here, the Location Update Request message is a message for registration to the CS domain, and the Attach Request message is a message for registration to the PS domain. In the embodiment illustrated in FIG. 8, the network 500 supports CS and PS domains each requiring a respective registration. However, the order of registration messages is not particularly limited and can be first to the CS domain and then to the PS domain as shown in FIG. 8, or where the network supports only one domain, one of the Location Update Request message and the Attach Request message may be omitted. Accordingly, any or both of the Location Update Request message and the Attach Request message can be transmitted depending on the capability of the network.

Upon receipt of the Registration Request messages, the network 500 verifies whether the terminal 200 is valid for the network 500 using the TMSI contained in the Registration Request messages (S809). That is, the network 500 determines whether the TMSI contained in the Registration Request messages is identical with the TMSI allocated by the network. FIG. 8 is depicted under the condition where the TMSIs are identical with each other such that the terminal is verified as a valid terminal. The network 500 verifies the validity of the terminal 200 based on the match of TMSIs (S811).

Consequently, the network 500 performs the registration process requested by the terminal 200 and sends the terminal 200 a Location Update Accept message indicating the successful registration to the CS domain in response to the Location Update Request message (S813) and sequentially an Attach Accept message indicating the successful registration to the PS domain in response to the Access Request message (S815). Here, if a new TMSI is allocated to the terminal 200, the newly allocated TMSI is contained in the Location Update Accept message and/or the Attach Accept message. Again, the order of registration messages is not particularly limited and can be first the successful CS domain registration message and then the successful PS domain registration message as shown in FIG. 8 or where the network supports only one domain, one of the Location Update Accept message and the Attach Accept message may be omitted. Depending on the type of the network 500, one or both of the Location Update Accept message and the Attach Accept message is/are transmitted.

Figure 9:
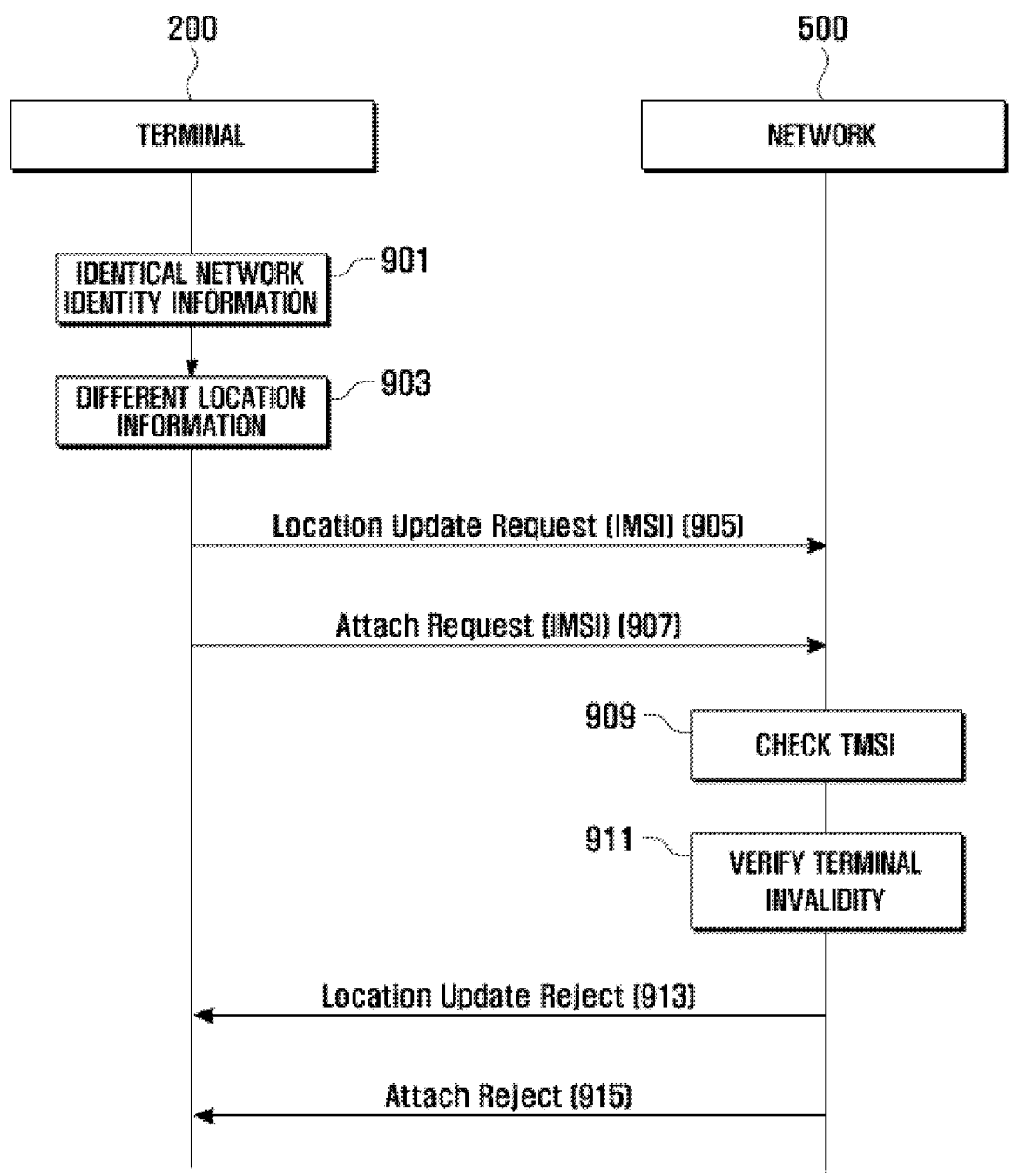
FIG. 9 is a message flow diagram illustrating steps of a registration procedure of the protection method of FIG. 7 when the SIM card attached to the terminal is invalid.

FIG. 9 is a message flow diagram illustrating steps of a registration procedure of the unauthorized use protection method of FIG. 7 when the SIM card attached to the terminal is invalid.

Referring to FIG. 9, the terminal 200 finds that the network identity information stored in the SIM card 100 and the network identity information received from the network 500 are identical with each other (S901) and further that the location information (i.e., the TMSI) stored in the SIM card 100 and the location information (TMSI) stored in the storage unit 250 differ from each other (S903). In this case, the terminal 200 generates a Registration Request message, i.e. the Location Update Request message and the Attach Request message containing the IMSI.

Next, the terminal 200 sends the Location Update Request message containing the IMSI (S905) and sequentially the Attach Request message containing the IMSI (S907). Depending on the type of the network 500, one or both of the Location Update Request message and the Attach Request message can be transmitted.

Upon receipt of the Registration Request messages, the network 500 verifies whether the terminal 200 is valid for the network 500 using the IMSI contained in the Registration Request messages (S909). That is, the network 500 determines whether the IMSI contained in the Registration Request messages is identical with the IMSI stored in the network 500. FIG. 9 is depicted under the assumption that the two IMSI differ from each other such that the terminal 200 is verified as an invalid terminal.

The network 500 verifies the invalidity of the terminal 200 based on the mismatch of the IMSIs (S911). That is, if the two IMSIs differ from each other, the network 500 regards the terminal 200 as an invalid terminal for use in the network, e.g. a terminal attached to a tampered SIM card.

Consequently, the network 500 sends the terminal 200 a Location Update Reject message indicating the registration failure to the CS domain in response to the Location Update Request message (S913) and sequentially an Attach Reject message indicating the registration failure to the PS domain in response to the Attach Reject message (S915). Depending on the type of the network 500, one or both of the Location Update Reject message and the Attach Reject message is/are transmitted.

The terminal 200 having received the Location Update Reject message and/or the Attach Reject message cannot then receive a normal service from the network 500, resulting in protection from unauthorized use of the terminal 200.

The Registration Request message can be transmitted to the network when the LAI or RAI changes due to the movement of the terminal and when a predetermined timer expires, as well as when the terminal powers on. The registration process described in detail with reference to FIG. 8 and FIG. 9 in association with the unauthorized use protection method depicted in FIG. 3, as described herein can also be applied in these exemplary scenarios.

As described above, the unauthorized use protection method of a terminal according to an embodiment of the present invention is advantageous since the terminal is protected from being used with a SIM card containing a tampered IMSI. In an exemplary embodiment, the terminal dedicated to a specific network carrier is protected from being used with a SIM card dedicated to another network carrier.

Also, the unauthorized use protection method of a terminal according to an embodiment of the present invention enables protecting against unauthorized use of the terminal, even when the terminal is activated by releasing the SIM lock/network lock with the IMSI copied from a valid SIM card for a specific network carrier, since the network rejects serving the terminal in a registration process (location registration process and/or access registration process).

Also, the unauthorized use protection method of a terminal according to an embodiment of the present invention can protect against unauthorized use of the terminal when any of the identity codes constituting the IMSI contained in the SIM card are tampered since the terminal identification is performed in cooperation with the network using the IMSI. The method of protecting a terminal against unauthorized use according to the exemplary embodiments of the present invention prevent the terminal dedicated to a specific network carrier from being used without permission of the network carrier.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of protecting against unauthorized use of a terminal operating with a subscriber identity module (SIM) card, the method comprising:
    comparing a temporary identity information stored in a storage unit of the terminal and a temporary identity information stored in the SIM card;
    sending a message containing a unique identity information to a network when the temporary identity information stored in a storage unit of the terminal and the temporary identity information stored in the SIM card differ from each other; and
    restricting operation of a function of the terminal when a registration reject message is received from the network in response to the message containing the unique identity information.

2. The method of claim 1, wherein the message containing the unique identity information is one of a registration request message and an identity response message.

3. The method of claim 2, wherein sending a message comprises:
    sending the registration request message containing a temporary identity information mismatch information to the network when the temporary identity information stored in a storage unit of the terminal and the temporary identity information stored in the SIM card differ from each other; and
    sending the identity response message containing the unique identity information to the network when a request message is received from the network.

4. The method of claim 3, wherein the request message is an identity request message.

5. The method of claim 2, further comprising:
    sending the registration request message containing one of the temporary identity information stored in a storage unit of the terminal and the temporary identity information stored in the SIM card to the network when the temporary identity information stored in a storage unit of the terminal and the temporary identity information stored in the SIM card are identical with each other; and
    sending the registration request message containing the unique identity information read from the SIM card when the temporary identity information stored in a storage unit of the terminal and the temporary identity information stored in the SIM card differ from each other.

6. The method of claim 1, wherein the unique identity information is an International Mobile Subscriber Identity (IMSI).

7. The method of claim 1, wherein the temporary identity information is one of a Temporary Mobile Subscriber Identity (TMSI) for registration to a Circuit Switched (CS) domain providing a voice call service and a Packet-Temporary Mobile Subscriber Identity (P-TMSI) for registration to a Packet Switched (PS) domain providing a packet call service.

8. The method of claim 3, wherein the temporary identity information mismatch information is a Temporary Mobile Subscriber Identity (TMSI) status information indicating that a TMSI representing the primary temporary identity information is invalid.

9. The method of claim 8, wherein the temporary identity information mismatch information comprises a Registered Public Land Mobile Network (RPLMN) that allocated the TMSI.

10. The method of claim 7, wherein the registration request message is one of a Location Update Request message for registration to the CS domain and an Attach Request message for registration to the PS domain.

11. The method of claim 10, further comprising:
    storing the temporary identity information carried by a registration accept message into the SIM card and the storage unit when the registration accept message is received from the network in response to the registration request message.

12. The method of claim 11, wherein the registration accept message is at least one of a location update accept message indicating successful registration to the CS domain in response to the location update request message and an attach accept message indicating successful registration to the PS domain in response to the attach request message.

13. The method of claim 12, wherein the temporary identity information stored in a storage unit of the terminal and the temporary identity information stored in the SIM card are compared when the terminal powers on, a Location Area Identifier (LAI) or a Routing Area Identifier (RAI) changes, or when a timer starting upon receipt of the registration accept message expires.

14. A terminal having a subscriber identity module (SIM) card, comprising:
   a radio frequency unit to establish a connection with a network to provide the terminal with a service;
   a storage unit to store a temporary identity information allocated by the network; and
   a control unit to compare the temporary identity information stored in the storage unit with a temporary identity information stored in the SIM card, to send a message containing a unique identity information to the network when the temporary identity information stored in the storage unit and the temporary identity information stored in the SIM card differ from each other, and to restrict operation of a function of the terminal when a registration reject message is received from the network in response to the message containing the unique identity information.

15. The terminal of claim 14, wherein the message containing the unique identity information is one of a registration request message and an identity response message.

16. The terminal of claim 15, wherein the control unit is operable to send the registration request message containing a temporary identity information mismatch information to the network when the temporary identity information stored in the storage unit and the temporary identity information stored in the SIM differ from each other.

17. The terminal of claim 16, wherein the control unit is operable to send the identity response message containing the unique identity information to the network when an identity request message is received from the network.

18. The terminal of claim 15, wherein the control unit is operable to send the registration request message containing one of the temporary identity information stored in the storage unit and the temporary identity information stored in the SIM card to the network when the temporary identity information stored in the storage unit and the temporary identity information stored in the SIM card are identical with each other.

19. The terminal of claim 18, wherein the control unit is operable to send the registration request message containing the unique identity information stored in the SIM card to the network when the temporary identity information stored in the storage unit and the temporary identity information stored in the SIM card differ from each other.

20. The terminal of claim 14, wherein the unique identity information is an Internal Mobile Subscriber Identity (IMSI).

21. The terminal of claim 14, wherein the temporary identity information is one of a Temporary Mobile Subscriber Identity (TMSI) for registration to a Circuit Switched (CS) domain providing a voice call service and a Packet-Temporary Mobile Subscriber Identity (P-TMSI) for registration to a Packet Switched (PS) domain providing a packet call service.

22. The terminal of claim 17, wherein the control unit is operable to send the registration request message containing information of a Temporary Mobile Subscriber Identity (TMSI) status indicating mismatch of the temporary identity information stored in the storage unit and the temporary identity information stored in the SIM card and a Registered Public Land Mobile Network (RPLMN) that allocated the TMSI when the temporary identity information stored in the storage unit and the temporary identity information stored in the SIM card differ from each other.

23. The terminal of claim 15, wherein the control unit is operable to store the temporary identity information carried by a registration accept message into the SIM card and the storage unit when the registration accept message is received from the network in response to the registration request message.

24. The terminal of claim 23, wherein the control unit is operable to compare the temporary identity information stored in the storage unit and the temporary identity information stored in the SIM card when the terminal powers on, a Location Area Identifier (LAI) or a Routing Area Identifier (RAI) changes, or when a timer starting upon receipt of the registration accept message expires.

25. A system to protect against unauthorized use of a terminal operating with a Subscriber Identity Module (SIM) card, the system comprising:
   a terminal to compare a temporary identity information stored in a storage unit and a temporary identity information stored in the SIM card, to send a message containing a unique identity information to a network when the temporary identity information stored in the storage unit and the temporary identity information stored in the SIM card differ from each other, and to restrict operation of a function of the terminal when a registration reject message is received from the network in response to the message containing the unique identity information; and
   the network to check the unique identity information contained in the message received from the terminal and send the registration reject message to the terminal when the unique identity information is invalid.

26. The system of claim 25, wherein the message containing the unique identity information is one of a registration request message and an identity response message.

27. The system of claim 26, wherein the temporary identity information is one of a Temporary Mobile Subscriber Identity (TMSI) for registration to a Circuit Switched (CS) domain providing a voice call service and a Packet-TMSI (P-TMSI) for registration to a Packet Switched (PS) domain providing a packet call service, and the unique identity information is an Internal Mobile Subscriber Identity (IMSI).

28. The system of claim 27, wherein the terminal is operable to send the registration request message containing a temporary identity information mismatch information to the network when the temporary identity information stored in the storage unit and the temporary identity information stored in the SIM card differ from each other.

29. The system of claim 28, wherein the network is operable to send an identity request message to the terminal in response to the registration request message containing the temporary identity information mismatch information.

30. The system of claim 29, wherein the terminal is operable to send the identity response message containing the unique identity information read from the SIM card to the network when the identity request message is received from the network.

31. The system of claim 30, wherein the network is operable to verify a validity of the terminal based on the unique identity information contained in the identity response message received from the terminal.

32. The system of claim 27, wherein the terminal is operable to send the registration request message containing one of the temporary identity information stored in the storage unit and the temporary identity information stored in the SIM card to the network when the temporary identity information stored in the storage unit and the temporary identity information stored in the SIM card are identical to each other.

33. The system of claim 32, wherein the terminal is operable to send the registration request message containing the unique identity information stored in the SIM card to the network when the temporary identity information stored in the storage unit and the temporary identity information stored in the SIM card differ from each other.

34. The system of claim 33, wherein the network is operable to verify a validity of the terminal based on one of the temporary identity information and the unique identity information extracted from the registration request message.

* * * * *